(12) United States Patent
Jung et al.

(10) Patent No.: US 9,906,301 B2
(45) Date of Patent: Feb. 27, 2018

(54) SINGLE MODULE BI-DIRECTIONAL OPTICAL TRANSMITTING AND RECEIVING SYSTEM

(71) Applicant: Electronics and Telecommunications Research Institute, Daejeon (KR)

(72) Inventors: Soo Yong Jung, Gwangju (KR); Jong Jin Lee, Gwangju (KR); Hyun Seo Kang, Gwangju (KR); Sei Hyoung Lee, Gwangju (KR); Hee Seung Kim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/209,399

(22) Filed: Jul. 13, 2016

(65) Prior Publication Data

US 2017/0126317 A1  May 4, 2017

(30) Foreign Application Priority Data

Nov. 4, 2015  (KR) .......................... 10-2015-0154493

(51) Int. Cl.
*H04B 10/25* (2013.01)
*H04B 10/40* (2013.01)
*H04B 10/50* (2013.01)

(52) U.S. Cl.
CPC ......... *H04B 10/2503* (2013.01); *H04B 10/40* (2013.01); *H04B 10/503* (2013.01)

(58) Field of Classification Search
CPC ... H04B 10/2503; H04B 10/503; H04B 10/40
See application file for complete search history.

(56) References Cited

U.S. PATENT DOCUMENTS

| 6,437,891 | B1 * | 8/2002 | Chandrasekhar | ...... H04B 10/43 257/80 |
| 2004/0120720 | A1 * | 6/2004 | Chang | .................... H04B 10/43 398/139 |
| 2004/0146304 | A1 * | 7/2004 | Kuhara | ................ G02B 6/4206 398/138 |
| 2004/0208601 | A1 * | 10/2004 | Tan | ...................... G02B 6/4206 398/135 |

(Continued)

FOREIGN PATENT DOCUMENTS

| KR | 10-2008-0073446 | 8/2008 |
| KR | 10-2012-0102668 A | 9/2012 |
| WO | 2011/051451 A1 | 5/2011 |

*Primary Examiner* — Danny Leung
(74) *Attorney, Agent, or Firm* — Nelson Mullins Riley & Scarborough LLP; Anthony A. Laurentano

(57) ABSTRACT

Provided herein is a single module bi-directional optical transmitting and receiving system including a transmitter transmitting an optical signal by converting a down-signal, and obtaining an up-signal by converting y the optical signal that is received, and a receiver transmitting the optical signal by converting the up-signal, and obtaining the down-signal by converting the optical signal that is received, wherein the transmitter and the receiver include a single optical transmitting module including a monitor receiving module, transmit the optical signal through the single optical transmitting module, and receive the optical signal through the monitor receiving module.

13 Claims, 5 Drawing Sheets

(56) References Cited

U.S. PATENT DOCUMENTS

| | | | | |
|---|---|---|---|---|
| 2005/0053380 A1* | 3/2005 | Kim | ............. | H04B 10/43 398/139 |
| 2005/0053381 A1* | 3/2005 | Wood | ............. | H04B 10/43 398/140 |
| 2005/0058455 A1* | 3/2005 | Aronson | ............. | H04B 10/07 398/135 |
| 2005/0123302 A1* | 6/2005 | Kuchta | ............. | H01P 5/02 398/135 |
| 2006/0280055 A1* | 12/2006 | Miller | ............. | G09G 5/006 369/44.11 |
| 2007/0154222 A1* | 7/2007 | Kim | ............. | H04B 10/43 398/141 |
| 2008/0008470 A1* | 1/2008 | Lin | ............. | G06F 3/14 398/66 |
| 2008/0187314 A1* | 8/2008 | Chung | ............. | H04B 10/2587 398/72 |
| 2009/0202252 A1* | 8/2009 | Sunaga | ............. | G02B 6/29361 398/139 |
| 2009/0220230 A1* | 9/2009 | Kim | ............. | H04B 10/2587 398/72 |
| 2010/0086310 A1* | 4/2010 | Lee | ............. | H04B 10/40 398/138 |
| 2010/0150561 A1* | 6/2010 | Cho | ............. | H04B 10/695 398/79 |
| 2010/0316373 A1* | 12/2010 | Chang | ............. | H04B 10/071 398/12 |
| 2011/0044696 A1* | 2/2011 | Lim | ............. | G02B 6/4246 398/139 |
| 2013/0077640 A1* | 3/2013 | Jiang | ............. | G02B 6/4274 370/464 |
| 2017/0126317 A1* | 5/2017 | Jung | ............. | H04B 10/2503 |

\* cited by examiner

SINGLE MODULE BI-DIRECTIONAL OPTICAL TRANSMITTING AND RECEIVING SYSTEM

CROSS-REFERENCE TO RELATED APPLICATION

The present application claims priority to Korean patent application number 10-2015-0154493, filed on Nov. 4, 2015, the entire disclosure of which is incorporated herein in its entirety by reference.

BACKGROUND

Field of Disclosure

Various embodiments of the present disclosure relate to a single module bi-directional optical transmitting and receiving system.

Description of Related Art

In a conventional optical communication system, a transmitter includes an optical transmitter to transmit data as an optical signal by using a laser diode (LD), and a receiver includes an optical receiver to obtain data by converting a received optical signal into an electrical signal by using a photo diode (PD).

On the other hand, in an optical communication system that supports bi-directional communication (hereinafter, a bi-directional optical transmitting and receiving system), both the transmitter and the receiver may be supposed to transmit and receive the optical signal. Therefore, each of the transmitter and the receiver may include the laser diodes (LD) and the photo diode (PD). As a result, two laser diodes and two photo diodes may be required to constitute the bi-directional optical transmitting and receiving system.

A structure of the bi-directional optical transmitting and receiving system may be applied even when high speed transmission and reception is not required. For example, since only a single directional transmission is required in the case of video data and audio data in a HDMI system, the video data and the audio data may be transmitted seamlessly when the transmitter (source) is provided with the laser diode, and the receiver (display) is provided with the photo diode. However, in the HDMI system, in the case of a display data channel (DDC) signal used for image optimization and protecting copyright, the bi-directional communication may be required according to the I2C communication standard. A required data transmitting rate may be hundreds of Kbps and lower than that of a normal optical communication system. However, each of the transmitter and the receiver should include the laser diode and the photo diode in order to support the bi-directional communication.

Accordingly, in the conventional HDMI system, due to excessive cost incurred by manufacturing the optical transmitting and receiving system, the DDC channel may not consist of an optical channel, but a wire, such that transmission and reception only by the electrical signal have been supported. However, when the electrical signal is used, long-distance transmission may be difficult.

SUMMARY

In order to solve the above problems, in the present disclosure, a signal module bi-directional optical transmitting and receiving system may be provided, which has a configuration of a signal module in which a transmitter and a receiver of a bi-directional optical transmitting and receiving system include a monitor photo diode mounted in a laser diode, not the laser diode and the photo diode.

According to the present disclosure, a single module bi-directional optical transmitting and receiving system may include a transmitter transmitting an optical signal by converting a down-signal, and obtaining an up-signal by converting y the optical signal that is received, and a receiver transmitting the optical signal by converting the up-signal, and obtaining the down-signal by converting the optical signal that is received, wherein the transmitter and the receiver include a single optical transmitting module including a monitor receiving module, transmit the optical signal through the single optical transmitting module, and receive the optical signal through the monitor receiving module.

DETAILED DESCRIPTION

Figure 1:
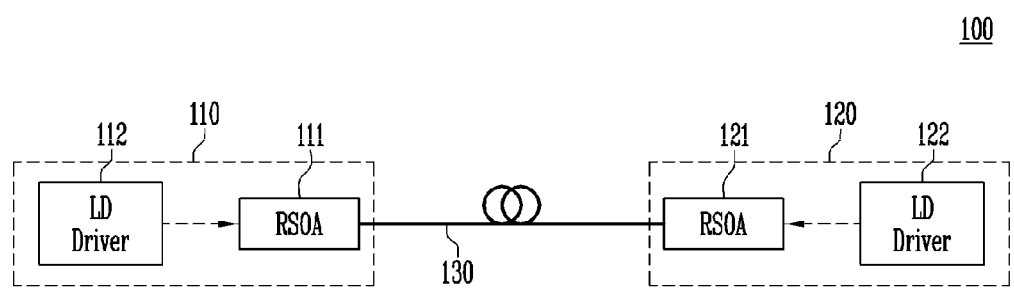
FIG. 1 is a schematic diagram illustrating a structure of a bi-directional optical transmitting and receiving system according to the present disclosure.

When the well-known functions and configurations in the following description of the embodiments of the present disclosure distract the subject matter of the present disclosure, the detailed description thereof may be omitted.

It will be understood that when an device or layer is referred to as being "on," "connected to," or "coupled to" another device or layer, it can be directly on, connected to, or coupled to the other device or layer, or one or more intervening devices or layers may be present. In addition, it will also be understood that when an device or layer is referred to as being "between" two devices or layers, it can be the only device or layer between the two devices or layers, or one or more intervening devices or layers may also be present.

The terminology used herein is for the purpose of describing particular embodiments only and is not intended to be limiting of the disclosure. It will be further understood that the terms "includes" and/or "including", when used in this specification, specify the presence of stated features, integers, steps, operations, devices, and/or components, but do not preclude the presence or addition of one or more other features, integers, steps, operations, devices, components, and/or groups thereof.

Furthermore, a singular form may include a plural from as long as it is not specifically mentioned in a sentence Hereinafter, embodiments will be described in greater detail with reference to the accompanying drawings.

According to the present disclosure, in a bi-directional optical transmitting and receiving system, a transmitter and a receiver may consist of a single optical module. The single optical module may consist of an optical transmitting module, for example, the single optical module may consist of a laser diode.

In various embodiments of the present disclosure, the single optical module may include a vertical cavity surface emitting laser (VCSEL), a fabrey perot laser diode (FP-LD), and a distributed feedback laser diode (DFB-LD). Alternatively, the single optical module may consist of reflective semiconductor optical amplifier (RSOA). Specifically, since the vertical cavity surface emitting laser (VCSEL) and the fabrey perot laser diode (FP-LD) have a small variation when the optical signal is received, the RSOA having a received optical signal with a greater width may be used in the present disclosure.

In general, a monitor photo diode (mPD) may be included in the optical transmitting module, for example, the laser diode, such as the RSOA. Since the monitor photo diode is configured to detect the received optical signal, the monitor photo diode included in the optical transmitting module may be utilized as an optical receiver in the present disclosure.

As a result, according to the present disclosure, the optical transmitting module operates as the optical transmitter at the time of operating as the optical receiver by using a mounted monitor photo diode. Accordingly, the single module bi-directional optical transmitting and receiving system may be implemented so that the transmitter and the receiver perform the bi-directional communication by using only the single optical transmitting module.

FIG. 1 is a schematic diagram illustrating a structure of a bi-directional optical transmitting and receiving system according to the present disclosure.

FIG. 1 is a schematic diagram illustrating a structure of a single module bi-directional optical transmitting and receiving system 100 by using a RSOA according to the present disclosure. Referring to FIG. 1, the single module bi-directional optical transmitting and receiving system 100 according to the present disclosure may include a transmitter 110 and a receiver 120. As described above, the transmitter 110 and the receiver 120 may include reflective semiconductor optical amplifiers (RSOA) 111 and 121, respectively. In addition, the transmitter 110 and the receiver 120 may include laser diode drivers 112 and 122 connected to the RSOAs 111 and 121.

When the transmitter 110 and the receiver 120 are connected to an optical fiber 130, the optical signal (a down-signal) transmitted from the RSOA 111 of the transmitter 110 may be received through the monitor photo diode included in the RSOA 121 of the receiver 120. In the same manner, the optical signal (an up-signal) transmitted from the RSOA 121 of the receiver 120 may be received through the monitor photo diode included in the RSOA 111 of the transmitter 110.

Figure 2:
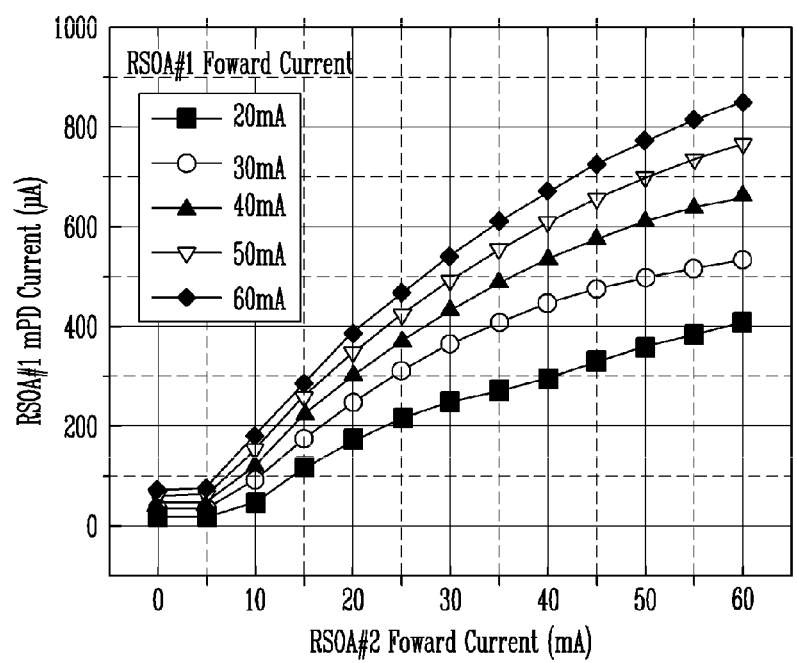
FIG. 2 is a graph illustrating output current of a monitor photo diode according to intensity of an optical signal received in a single bi-directional optical transmitting and receiving system according to the present disclosure.

FIG. 2 is a graph illustrating output current of a monitor photo diode according to intensity of an optical signal received in a single bi-directional optical transmitting and receiving system according to the present disclosure.

Referring to FIG. 2, when the transmitter 110 and the receiver 120 may include the RSOAs 111 and 121, respectively, and the transmitter 110 and the receiver 120 are connected by the optical fiber 130, as intensity of the optical signal received from the RSOAs 111 and 121 increases, current output from the monitor photo diode may increase.

Accordingly, when an optical signal of an amplified spontaneous emission (ASE) of the transmitter 110 is modulated and transmitted through the RSOA 111, the optical signal may be extracted through the monitor photo diode of the RSOA 121 positioned at the receiver 120.

Hereinafter, a specific configuration of the bi-directional optical transmitting and receiving system including the transmitter and the receiver consisting of a single optical transmitting and the receiving module will be described.

Figure 3:
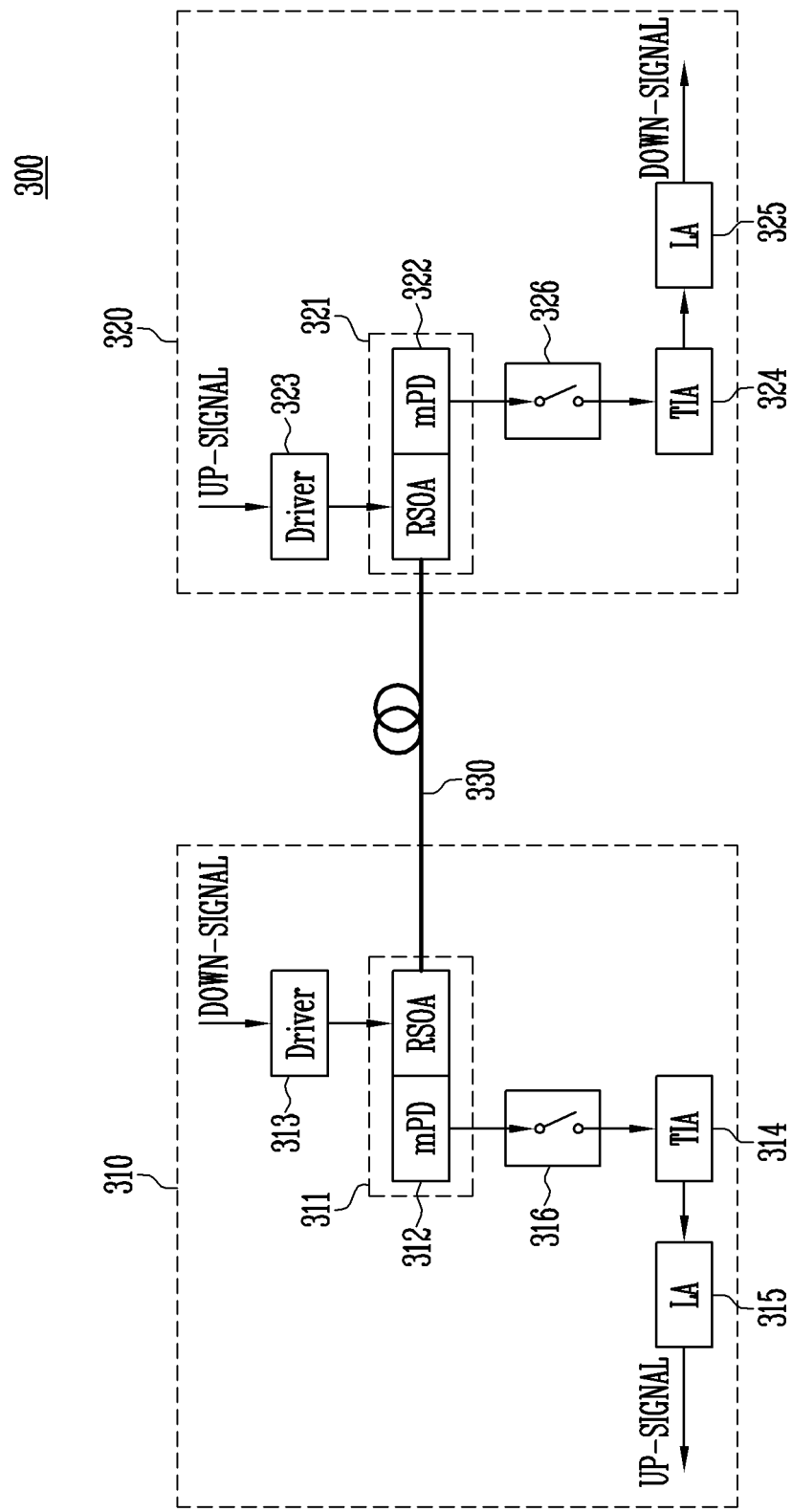
FIG. 3 is a diagram illustrating a structure of a single module half duplex bi-directional optical transmitting and receiving system according to the present disclosure.

FIG. 3 is a diagram illustrating a structure of a single module half duplex bi-directional optical transmitting and receiving system according to the present disclosure Referring to FIG. 3, a half-duplex bi-directional optical transmitting and receiving system of the present disclosure 300 may include a transmitter 310 and a receiver 320. The transmitter 310 may convert the up-signal in the form of an electrical signal into the optical signal and transmit the signal to the receiver 320, or convert the up-signal in the form of the optical signal received from the receiver 320 into the electrical signal. The receiver 320 may convert the up-signal in the form of the electrical signal into the optical signal and transmit the signal to the transmitter 310, or the down-signal in the form of the optical signal received from the transmitter 310 into the electrical signal.

To this end, the transmitter 310 and the receiver 320 may include optical transmitting modules 311 and 321, respectively, and the optical transmitting modules 311 and 321 may include monitor receiving modules 312 and 322. In FIG. 3, the optical transmitting modules 311 and 321 may be the RSOA, and it is exemplified that each of the RSOA constituting the transmitter 310 and the receiver 320, respectively, includes the monitor photo diode.

Hereinafter, a specific configuration of the transmitter 310 and the receiver 320 will be described in detail.

The transmitter 310 may transmit the down-signal to the receiver 320 or receive the up-signal from the receiver 320.

The transmitter 310 may convert the down-signal in the form of the electrical signal into the optical signal through a driver 313, and output a converted optical signal through the optical transmitting module 311. The output optical signal may be transmitted to the receiver 320 through an optical fiber 330.

In addition, the transmitter 310 may receive the optical signal transmitted through the optical fiber 330 through the monitor optical receiving module 312 mounted in the optical transmitting module 311. The monitor optical receiving module 312 may convert the received optical signal into the electrical signal and output the current. A trans impedance amplifier (TIA) 314 may amplify the current output from the monitor optical receiving module 312 and convert the current into a voltage signal. A limiting amplifier (LA) 315 may convert the voltage signal output from the TIA 314 into a digital signal, thereby amplifying the digitals signal.

The transmitter 310 may alternately transmission of the down-signal and reception of the up-signal by using a switch 316.

The receiver 320 may transmit the up-signal to the transmitter 310 or receive the down-signal from the transmitter 310.

The receiver 320 may convert the up-signal in the form of the electrical signal through a driver 323 into the optical signal, and output the converted optical signal through the optical transmitting module 321. The output optical signal may be transmitted to the transmitter 310 through the optical fiber 330.

In addition, the receiver 320 may receive the optical signal transmitted through the optical fiber 330 via the monitor optical receiving module 322 mounted in the optical transmitting module 321. The monitor optical receiving module 322 may convert the received optical signal into the electrical signal and output the current. A TIA 324 may amplify the current output from the monitor optical receiving module 322, convert the current into the voltage signal and output the signal. A LA 325 may convert the voltage signal output from the TIA 324 into the digital signal, thereby amplifying the signal.

The receiver 320 may alternately control the transmission of the up-signal and the reception of the down-signal by using the switch 326.

As described above, the transmitter 310 and the receiver 320 illustrated in FIG. 3 may control the transmission and the reception by using the switches 316 and 326. Accordingly, in the embodiment illustrated in FIG. 3, the half-duplex bi-directional optical transmitting and receiving system may operate. Thus, the single module half-duplex bi-directional optical transmitting and receiving system 300 may be applied to the communication system in accordance with the I2C communication standard, such as the DDC.

Figure 4:
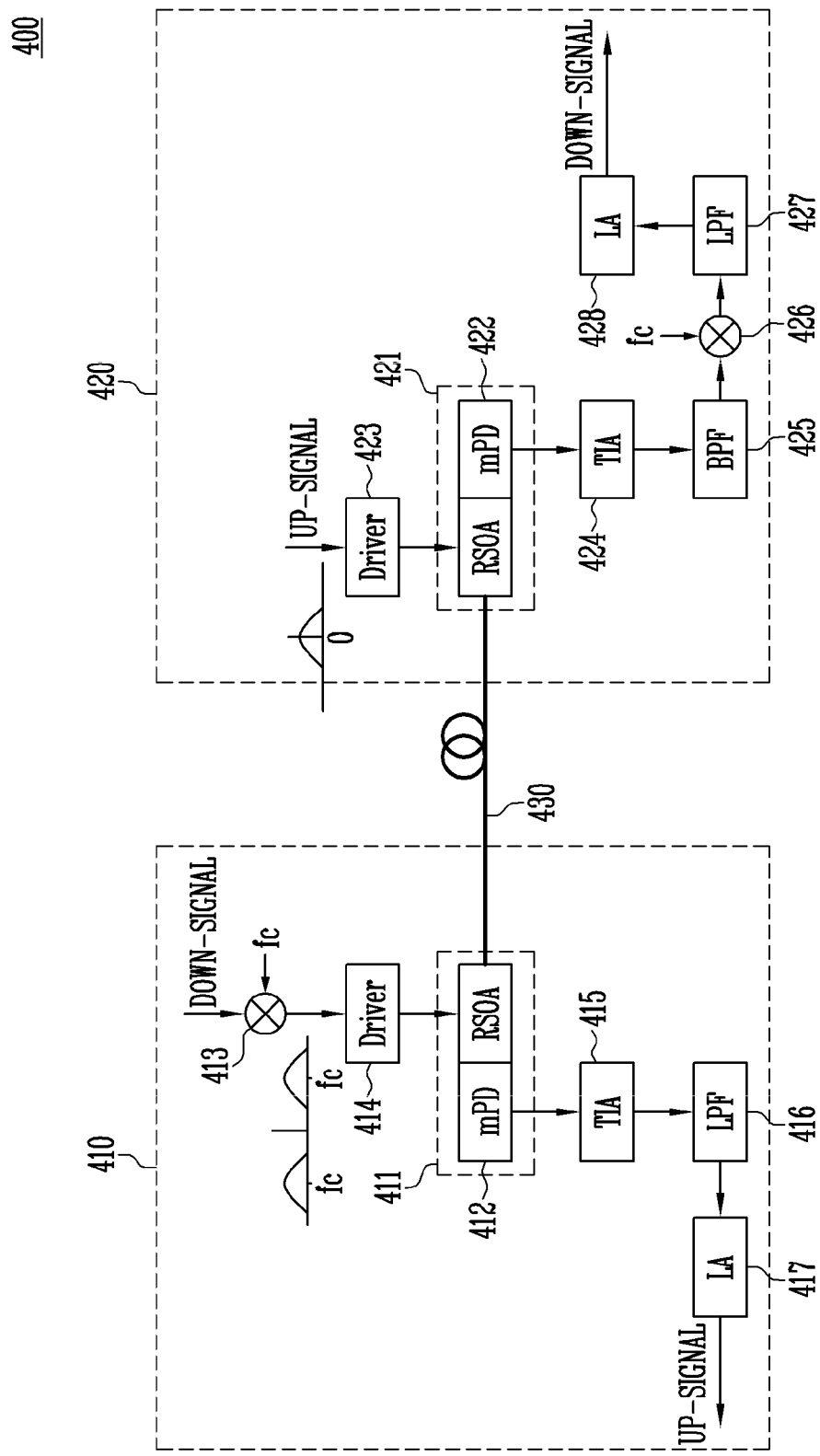
FIG. 4 is a diagram illustrating a structure of a single module full duplex bi-directional optical transmitting and receiving system according to the present disclosure.

As illustrated in FIG. 3, when supporting the full-duplex bi-directional optical transmitting and receiving system by using optical transmitting modules 311 and 321 to the transmitter 310 and the receiver 320, respectively, the system may be configured as illustrated in FIG. 4.

FIG. 4 is a diagram illustrating a structure of a single module full duplex bi-directional optical transmitting and receiving system according to the present disclosure.

Referring to FIG. 4, a single module full-duplex bi-directional optical transmitting and receiving system 400 of the present disclosure includes a transmitter 410 and a receiver 420. As shown in FIG. 3, the transmitter 310 and the receiver 420 include optical transmitting modules 411 and 421, respectively, and the optical transmitting modules 411 and 421 include monitor receiving modules 412 and 422. In FIG. 4, the optical transmitting modules 411 and 421 may be the RSOA, and it is exemplified that each of the RSOA constituting the transmitter 410 and the receiver 420 includes the monitor photo diode.

The transmitter 410 and the receiver 420 of the single module full-duplex bi-directional optical transmitting and receiving system 400 shown in FIG. 4 further includes multipliers 413 and 426 and filters 416, 425 and 427 in order to support the full-duplex bi-directional transmitting and receiving system compared to FIG. 3. In other words, the transmitter 410 and the receiver 420 may separate the down-signal from the up-signal by using the multipliers 413 and 426 and the filters 416, 425 and 427. When the up-signal and the down-signal have different frequency bands, the transmitter 410 and the receiver 420 may separate the down-signal from the up-signal by using only the filters 416, 425 and 427. When the up-signal and the down-signal have the same frequency bands, the transmitter 410 and the receiver 420 may separate the down-signal from the up-signal by using the filters 416, 425 and 427 after performing up conversion of one of the signals by using the multipliers 413 and 426.

The transmitter 410 may transmit the down-signal to the receiver 420 or receive the up-signal from the receiver 420.

The transmitter 410 may convert a center frequency of the down-signal by calculating a predetermined frequency signal fc and the down-signal through the multiplier 413. The down-signal in the form of the electrical signal may be converted into the optical signal through a driver 414 and output through the optical transmitting module 411. The output optical signal may be transmitted to the receiver 420 through the optical fiber 430.

Further, the transmitter 410 may receive the optical signal transmitted through the optical fiber 430 through the monitor optical receiving module 412 mounted in the monitor optical transmitting module 411. The monitor optical receiving module 412 may convert the received optical signal into the electrical signal and output the current. A TIA 415 may amplify the current output from the monitor optical receiving module 412, convert the current into the voltage signal and output the signal. The filter 416 may filter a converted voltage signal to a frequency band predetermined for the up-signal. In the embodiment, the filter 416 may consist of a low pass filter (LPF). A LA 417 may convert the voltage signal output from the filter 416 into the digital signal to be amplified.

The receiver 420 may transmit the up-signal to the transmitter 410 or receive the down-signal from the transmitter 410.

The receiver 420 may convert the up-signal in the form of the electrical signal through a driver 423 into the optical signal, and output the converted optical signal through the optical transmitting module 421. The output optical signal may be transmitted to the transmitter 410 through the optical fiber 430.

In addition, the receiver 420 may receive the optical signal transmitted through the optical fiber 430 through the monitor optical receiving module 422 mounted in the optical transmitting module 421. The monitor optical receiving module 422 may convert the received optical signal into the electrical signal and output the current. A TIA 424 may amplify the current from the monitor optical receiving module 422 and output the signal by converting the current into the voltage signal. The first filter 425 may filter the converted voltage signal to the frequency band predetermined for the down-signal. In the embodiment, the first filter 425 may include a band pass filter (BPF). The multiplier 426 may convert the center frequency of the voltage signal by calculating the voltage signal filtered at the first filter 425 and the predetermined frequency signal fc. A second filter 427 may filter the voltage signal including converted center frequency to the frequency band for the down-signal. In the embodiment, the second filter 427 may include the low-pass filter. A LA 428 may amplify the signal by converting the voltage signal output from the second filter 427 into the digital signal.

In the embodiment of FIG. 4, it is exemplified that the frequency band of the down-signal is modulated. However, in another embodiment, the frequency band of the up-signal may be modulated. In this case, each structure of the transmitter 410 and the receiver 420 may be interchanged.

Figure 5:
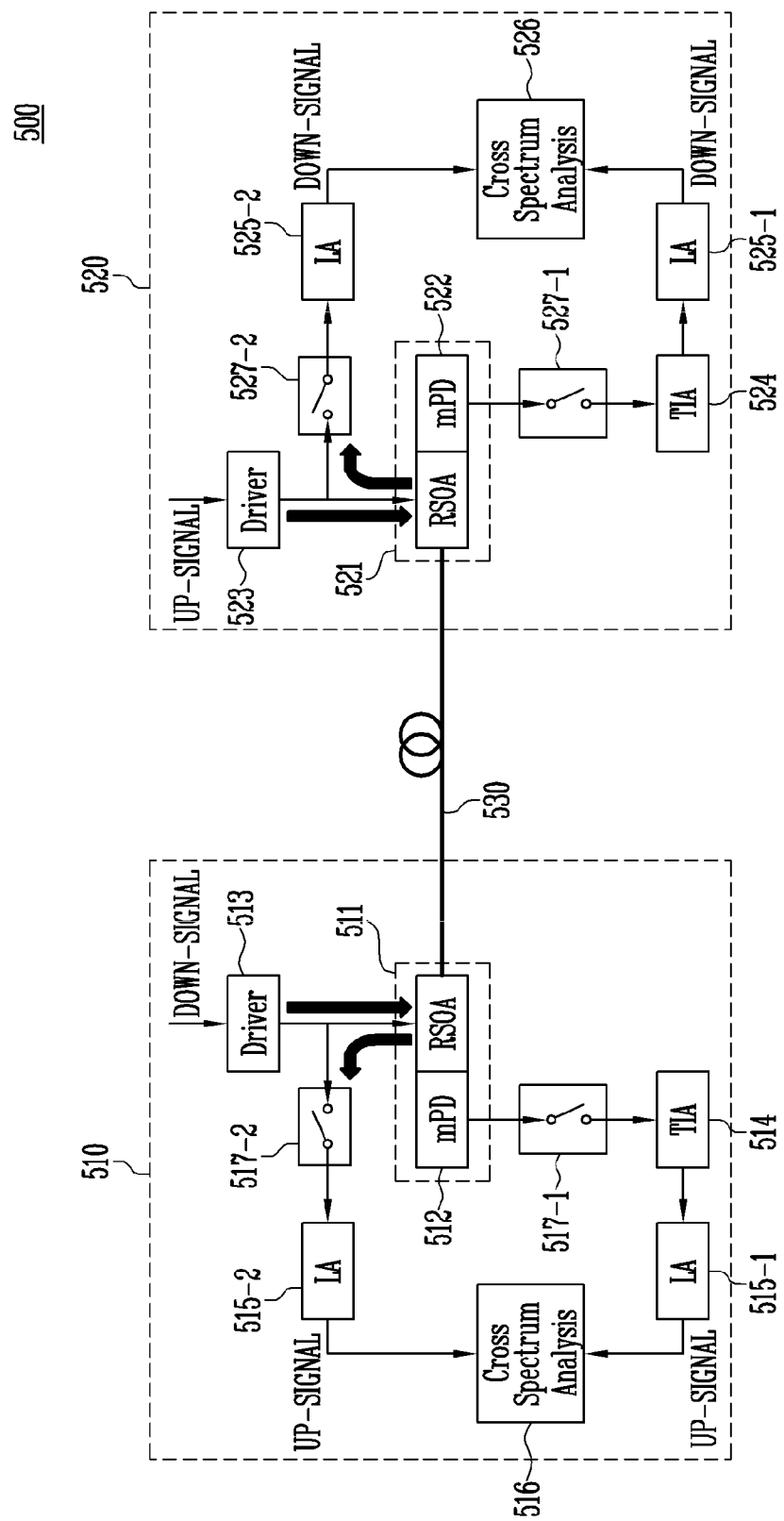
FIG. 5 is a diagram illustrating a structure of a single module full duplex bi-directional optical transmitting and receiving system to which a cross-spectrum method is applied according to the present disclosure.

FIG. 5 is a diagram illustrating a structure of a single module full duplex bi-directional optical transmitting and receiving system to which a cross-spectrum method is applied according to the present disclosure.

When the down-signal transmitted from a single transmitter is received with two receivers, in cross-correlation of signals received from two receivers, two signals may be amplified since the down-signals included in the two signals are in the cross-correlation, whereas a noise signal may be removed since the signal is uncorrelated. A cross-spectrum technique may utilize the above principle, so that a technique for removing noise included in the down-signal by receiving the down-signal by using the two receivers may be used.

As described above, the two receivers may be required to apply the cross-spectrum technique. However, in the case of the RSOA, when input optical power is changed, carrier density inside of the RSOA may be changed, and a change in the carrier density causes a change of an applied voltage of the RSOA. Accordingly, the RSOA may be able to operate as the receiver itself.

With the characteristics, the cross-spectrum technique may be applied by using signals received from the monitoring photo diode embedded in the RSOA and the signal received from the RSOA itself.

Referring to FIG. 5, a single module half-duplex bi-directional optical transmitting and receiving system 500 to which the cross-spectrum technique is applied of the present disclosure comprises a transmitter 510 and a receiving unit 520. The transmitter 510 and the receiver 520 may include optical transmitting modules 511 and 521, respectively, and the optical transmitting modules 511 and 521 may include monitor optical receiving modules 512 and 522. In FIG. 5, the optical transmitting modules 511 and 521 may be the RSOA, and it is exemplified that each of the RSOA constitutes the transmitter 510 and the receiver 520 including the monitor photo diode.

The transmitter 510 may transmit the down-signal to the receiver 520 or receive the up-signal from the receiver 520.

The transmitter 510 may convert the down-signal in the form of the electrical signal through a driver 513 into the optical signal, and output the converted optical signal through the optical transmitting module 511. The output optical signal may be transmitted to the receiver 520 through the optical fiber 530.

In addition, the transmitter 510 may receive the optical signal transmitted through the optical fiber 530 through the monitor optical receiving module 512 mounted in the optical transmitting module 511. The monitor optical receiving module 512 may convert the received optical signal into the electrical signal and output the current. A TIA 514 may amplify the current output from the monitor optical receiving module 512 and output the signal by converting the current into the voltage signal. A first LA 515-1 may amplify the signal by converting the voltage signal output from the TIA 514 into the digital signal.

In the embodiment of the present disclosure, the transmitter 510 may be implemented to receive the optical signal transmitted through the optical fiber 530 in the optical transmitting module 511 itself. The optical signal received from the optical transmitting module 511 may be converted into the digital signal through a first LA 2 515-2.

A cross-spectrum calculating unit 516 may remove the noise by applying the cross-spectrum technique to the signals output from the first LA 515-1 and the second LA 515-2.

The transmitter 510 may alternately control the transmission of the down-signal and the reception of the up-signal by using a plurality of switches 517-1 and 517-2.

The receiver 520 may transmit the up-signal to the transmitter 510 and receive the down-signal from the transmitter 510.

The receiver 520 may convert the up-signal in the form of the electrical signal through a driver 523 into the optical signal, and output the converted optical signal through the optical transmitting module 521. The output optical signal may be transmitted to the transmitter 510 through the optical fiber 530.

In addition, the receiver 520 may receive the optical signal transmitted via the optical fiber 530 through the monitor optical receiving module 522 mounted in the optical transmitting module 521. The monitor optical receiving module 522 may convert the received optical signal into the electrical signal and output the current. A TIA 524 may amplify the current output from the monitor optical receiving module 522 and output the signal by converting the current into the voltage signal. A first LA 525-1 may amplify the signal by converting the voltage signal output from the TIA 524 into the digital signal.

In the embodiment of the present disclosure, the receiver 520 may be implemented to receive the optical signal transmitted through the optical fiber 530 in the optical transmitting module 521 itself. The optical signal received from the optical transmitting module 521 may be converted into digital signal through a second LA 525-2.

A cross-spectrum calculating unit 526 may remove the noise by applying the cross-spectrum technique to the signals output from the first LA 525-1 and the second LA 525-2.

The receiver 520 may alternately control the transmission of the up-signal and the reception of the down-signal by using a plurality of switches 527-1 and 527-2.

The cross-spectrum technique described above may also be applied to the full-duplex bi-directional optical transmitting and receiving system as well as the half-duplex bi-directional optical transmitting and receiving system. Hereinafter, description will now be given on the single module full-duplex bi-directional optical transmitting and receiving system to which the cross-spectrum technique is applied.

Figure 6:
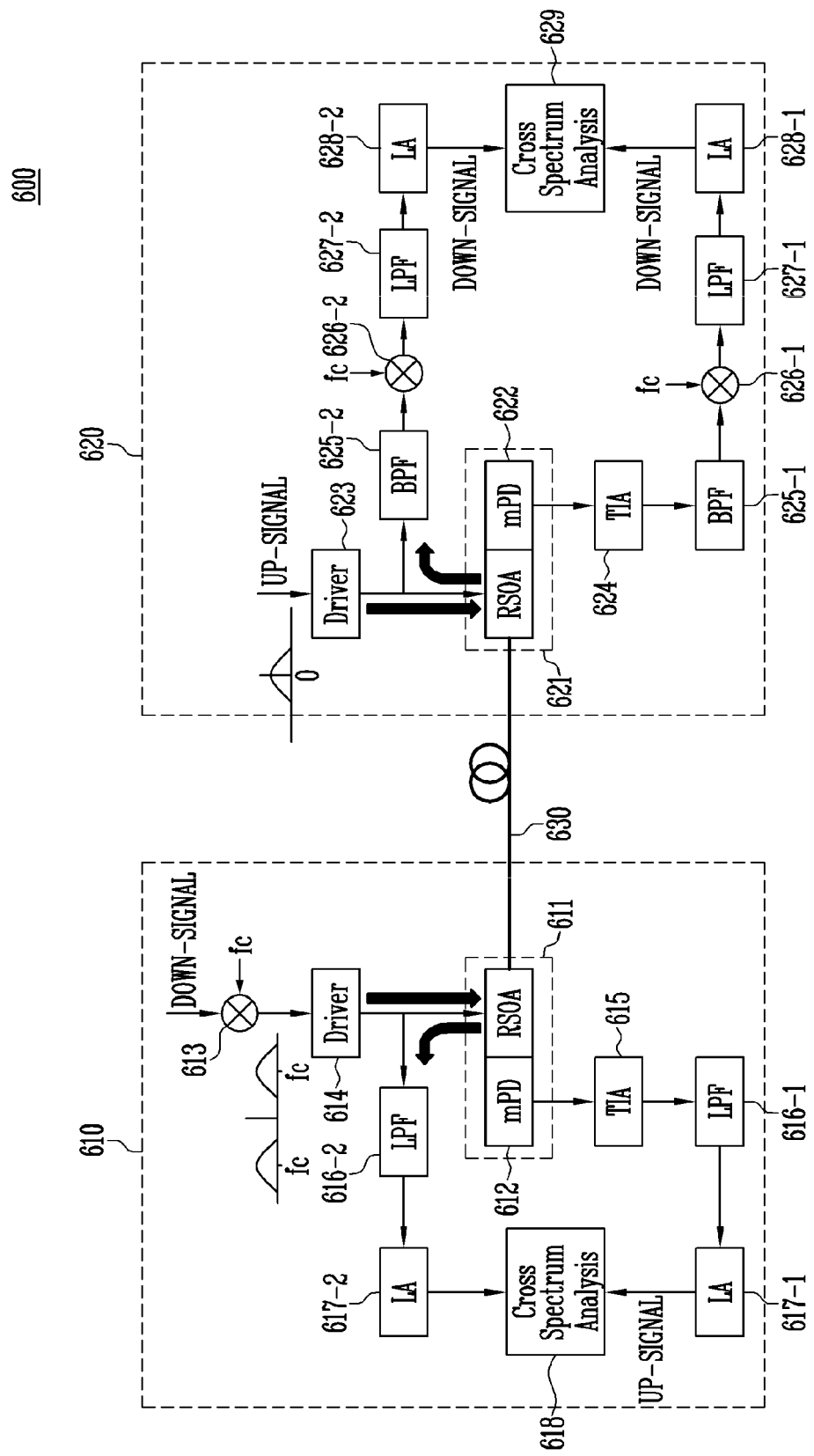
FIG. 6 is a diagram illustrating a structure of a single module full duplex bi-directional optical transmitting and receiving system to which cross-spectrum method is applied according to the present disclosure.

FIG. 6 is a diagram illustrating a structure of a single module full duplex bi-directional optical transmitting and receiving system to which cross-spectrum method is applied according to the present disclosure.

Referring to FIG. 6, the single full-duplex bi-directional optical transmitting and receiving module system 600 to which the cross-spectrum technique of the present disclosure is applied may include a transmitter 610 and a receiver 620. The transmitter 610 and the receiver 620 include optical transmitting modules 611 and 621, respectively, and the optical transmitting modules 611 and 621 may include monitor optical receiving modules 612 and 622. In FIG. 6, the optical transmitting modules 611 and 621 may be the RSOA, and it is exemplified that each of the RSOA constituting the transmitter 610 and the receiver 620 may include the monitor photo diode.

The transmitter 610 may transmit the down-signal to the receiver 620 and receive the up-signal from the receiver 620.

The transmitter 610 may convert the central frequency of the down-signal by calculating the down-signal and the predetermined frequency signal fc by using a multiplier 613. Subsequently, the down-signal in the form of the electrical signal may be converted into the optical signal through a driver 614, and output through the optical transmitting module 611. The output optical signal may be transmitted to the receiver 620 through the optical fiber 630.

In addition, the transmitter 610 may receive the optical signal transmitted via the optical fiber 630 through the monitor optical receiving module 612 mounted in the optical transmitting module 611. The monitor optical receiving module 612 may convert the received optical signal into the electrical signal and output the current. A TIA 615 may amplify the current output from the monitor optical receiving module 612 and output the signal by converting the current into the voltage signal. A first filter 616-1 may filter the converted voltage signal to the frequency band predetermined for the up-signal. In the embodiment, the first filter 616-1 may include the low pass filter (LPF). A first LA 617-1 may amplify the signal by converting the voltage signal output from the first filter 616-1 into the digital signal.

In the embodiment of the present disclosure, the transmitter 610 may be implemented to receive the optical signal transmitted through the optical fiber 630 in the optical transmitting module 611 itself. The optical signal received from the optical transmitting module 611 may be filtered through a second filter 616-2, and converted into the digital signal through a second LA 617-2.

A cross-spectrum calculating unit 618 may remove the noise by applying the cross-spectrum technique to the signals output from the first LA 617-1 and the second LA 617-2.

The receiver 620 may transmit the up-signal to the transmitter 610 and receive the down-signal from the transmitter 610.

The receiver 620 may convert the up-signal in the form of the electrical signal through a driver 623 into the optical signal, and output the converted optical signal through the optical transmitting module 621. The output optical signal may be transmitted to the transmitter 610 through the optical fiber 630.

In addition, the receiver 620 may receive the optical signal received via the optical fiber 630 through the monitor optical receiving module 622 mounted in the optical transmitting module 621. The monitor optical receiving module 622 may convert the received optical signal into the electrical signal and output the current. A TIA 624 may amplify the current output from the monitor optical receiving module 622 and output the signal by converting the current into the voltage signal. A first filter 625-1 may filter the converted voltage signal to the frequency band predetermined for the down-signal. In the embodiment, the first filter 625-1 may include a band pass filter (BPF). A first multiplier 626-1 may convert the center frequency of the voltage signal by calculating the predetermined frequency signal fc and the voltage signal filtered by the first filter part 625-1. A second filter 627-1 may filter the voltage signal including the converted center frequency to the frequency band predetermined for the down-signal. In the embodiment, the second filter 627 may include the low-pass filter. A first LA 628-1 may amplify the signal by converting the voltage signal output from the second filter 627-1 into the digital signal.

In the embodiment of the present disclosure, the receiver 620 may be implemented to receive the optical signal transmitted through the optical fiber 630 in the optical transmitting module 621 itself. After the optical signal received from the optical transmitting module 621 is filtered through a third filter 625-2, and calculated with the predetermined frequency signal fc at a second multiplier 626-2, the optical signal may be filtered once again at a fourth filter 627-2 and converted into the digital signal through a second LA 628-2.

A cross-spectrum calculating unit 629 may remove the noise by applying the cross-spectrum technique to the signals output from the first 628-1 and the second LA 628-2.

The single module bi-directional optical transmitting and receiving system according to the present disclosure may reduce the manufacturing cost compared with the prior art including the transmitter and the receiver consisting of the laser diode and the photo diode.

In addition, the single module bi-directional optical transmitting and receiving system according to the present disclosure may not require high speed communication such as the DDC channel of the HDMI, but may be effectively used for the optical communication system in which the bi-directional transmitting and receiving system is required.

In addition, the single bi-directional optical transmitting and receiving module system according to the present disclosure, may improve the light transmission properties by applying noise removal using the cross spectrum technique.

In the drawings and specification, there have been disclosed typical exemplary embodiments of the disclosure, and although specific terms are employed, they are used in a generic and descriptive sense only and not for purposes of limitation. As for the scope of the disclosure, it is to be set forth in the following claims. Therefore, it will be understood by those of ordinary skill in the art that various changes in form and details may be made therein without departing from the spirit and scope of the present disclosure as defined by the following claims.

What is claimed is:

1. A single module bi-directional optical transmitting and receiving system, comprising:
   a transmitter transmitting an optical down-signal by converting an input down-signal, and obtaining an up-signal by converting an optical up-signal that is received; and
   a receiver transmitting the optical up-signal by converting an input up-signal, and obtaining a down-signal by converting the optical down-signal that is received,
   wherein the transmitter and the receiver include a single optical transmitting module including a monitor receiving module, transmit the optical signal through the single optical transmitting module, and receive the optical signal through the monitor receiving module;
   wherein the transmitter further includes
      a multiplier converting a frequency by calculating an electrical signal corresponding to the down-signal and a predetermined frequency signal; and
      a driver converting an electrical signal including the frequency that is converted into the optical signal, wherein the single optical transmitting module transmits the optical signal that is converted and output from the driver.

2. The single module bi-directional optical transmitting and receiving system according to claim 1, wherein the optical transmitting module is one of a vertical cavity surface emitting laser (VCSEL), a fabrey perot laser diode (FP-LD), a reflective semiconductor optical amplifier (RSOA), and a distributed feedback laser diode (DFB-LD).

3. The single module bi-directional optical transmitting and receiving system according to claim 1, wherein the monitor receiving module is a monitor photo diode (mPD).

4. The single module bi-directional optical transmitting and receiving system according to claim 1, wherein the transmitter and the receiver further comprise a driver converting an electrical signal corresponding to the input down-signal or the input up-signal into the corresponding optical signal, wherein the single optical transmitting module transmits the corresponding optical signal that is converted and output from the driver.

5. The single module bi-directional optical transmitting and receiving system according to claim 1, wherein the transmitter and the receiver further comprise:
   a trans impedance amplifier (TIA) amplifying the corresponding optical signal received through the monitor receiving module and converting the corresponding optical signal to a voltage signal; and
   a limiting amplifier (LA) converting the voltage signal converted in the TIA into a digital signal.

6. The single module bi-directional optical transmitting and receiving system according to claim 1, wherein the transmitter and the receiver further comprise a switch for alternately controlling transmission of the corresponding optical signal and reception of the corresponding optical signal.

7. The single module bi-directional optical transmitting and receiving system according to claim 1, wherein the transmitter further comprises:
a TIA amplifying the optical signal received through the monitor receiving module and converting the optical signal into a voltage signal;
a filter filtering the voltage signal converted in the TIA to a predetermined frequency band for the up-signal; and
a LA converting the voltage signal that is filtered to a digital signal.

8. The single module bi-directional optical transmitting and receiving system according to claim 1, wherein the receiver comprises:
a TIA amplifying the optical signal received through the monitor receiving module and converting the optical signal into a voltage signal;
a first filter filtering the voltage signal converted in the TIA to a predetermined frequency band for the down-signal;
the multiplier converting the frequency by calculating the voltage signal that is filtered in the first filter and the predetermined frequency signal;
a second filter filtering the voltage signal including the frequency that is converted; and
a LA converting the voltage signal that is filtered in the second filter into a digital signal.

9. The single module bi-directional optical transmitting and receiving system according to claim 1, wherein the transmitter and the receiver further comprise a cross-spectrum calculating unit removing noise by applying cross-spectrum with respect to the optical signal received through the monitor receiving module and the optical signal received through the single optical transmitting module.

10. The single module bi-directional optical transmitting and receiving system according to claim 9, wherein the transmitter and the receiver comprise:
a TIA amplifying the optical signal received through the monitor receiving module and converting the optical signal into a voltage signal;
a first LA converting the voltage signal converted in the TIA into a digital signal; and
a second LA converting the optical signal received through the single optical transmitting module into the digital signal,
wherein the cross-spectrum calculating unit applies the cross spectrum with respect to the digital signal that is converted in the first LS and the second LA.

11. The single module bi-directional optical transmitting and receiving system according to claim 9, wherein the transmitter comprises:
a TIA amplifying the optical signal received through the monitor receiving module and converting the optical signal into the voltage signal;
a first filter filtering the voltage signal converted in the TIA to a predetermined frequency band for the up-signal;
a first LA converting the voltage signal filtered in the first filter into a digital signal;
a second filter filtering the optical signal received through the single optical transmitting module to the predetermined frequency band for the up-signal; and
a second LA converting the optical signal filtered in the second filter into the digital signal,
wherein the cross-spectrum calculating unit applies the cross-spectrum with respect to the digital signal converted in the first LA and the second LA.

12. The single module bi-directional optical transmitting and receiving system according to claim 10, wherein the receiver comprises:
the TIA amplifying the optical signal received through the monitor receiving module and converting the optical signal into the voltage signal;
a first filter filtering the voltage signal converted in the TIA to a predetermined frequency band for the down-signal;
a first multiplier converting a frequency by calculating the voltage signal filtered in the first filter and a predetermined frequency signal;
a second filter filtering the voltage signal including the frequency that is converted in the first multiplier;
the first LA converting the voltage signal filtered in the second filter to the digital signal;
a third filter filtering the optical signal received through the single optical transmitting module to the predetermined frequency band for the down-signal;
a second multiplier converting the frequency by calculating the optical signal filtered in the third filter with the predetermined frequency signal;
a fourth filter filtering the optical signal including the frequency is converted in the second multiplier; and
the second LA converting the optical signal filtered in the fourth filter into the digital signal,
wherein the cross-spectrum calculating unit applies the cross-spectrum with respect to the digital signal converted in the first LA and the second LA.

13. The single module bi-directional optical transmitting and receiving system according to claim 1, further comprising an optical fiber connecting the transmitter to the receiver.

* * * * *